US012497142B2

(12) United States Patent
Amma et al.

(10) Patent No.: US 12,497,142 B2
(45) Date of Patent: Dec. 16, 2025

(54) METHOD AND APPARATUS FOR DISPLAYING AZIMUTH OF MARINE VESSEL, MARINE VESSEL, AND STORAGE MEDIUM

(71) Applicant: YAMAHA HATSUDOKI KABUSHIKI KAISHA, Iwata (JP)

(72) Inventors: Hirofumi Amma, Shizuoka (JP); Hidenori Satake, Shizuoka (JP); Yukitaka Okamoto, Shizuoka (JP); Hideyoshi Sato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 239 days.

(21) Appl. No.: 18/519,240

(22) Filed: Nov. 27, 2023

(65) Prior Publication Data
US 2024/0174328 A1    May 30, 2024

(30) Foreign Application Priority Data
Nov. 29, 2022 (JP) .................................. 2022-190187

(51) Int. Cl.
  G06F 17/00 (2019.01)
  B63B 49/00 (2006.01)
  B63B 79/10 (2020.01)

(52) U.S. Cl.
  CPC .............. B63B 49/00 (2013.01); B63B 79/10 (2020.01)

(58) Field of Classification Search
  CPC .................................. B63B 49/00; B63B 79/10
  USPC ......................................................... 701/21
  See application file for complete search history.

(56) References Cited

U.S. PATENT DOCUMENTS

| | | | | |
|---|---|---|---|---|
| 9,505,477 | B2 * | 11/2016 | Grace ..................... | G07C 5/008 |
| 10,393,529 | B2 * | 8/2019 | Steward ................... | B63B 79/30 |
| 12,017,792 | B2 * | 6/2024 | Davis ....................... | G08G 5/26 |
| 2003/0137443 | A1 * | 7/2003 | Rees ..................... | G01S 13/937 |
| | | | | 342/41 |
| 2010/0017123 | A1 * | 1/2010 | Dropps ................ | G01C 21/387 |
| | | | | 701/455 |
| 2015/0029824 | A1 * | 1/2015 | Ferretti ..................... | G01S 7/56 |
| | | | | 367/107 |

(Continued)

FOREIGN PATENT DOCUMENTS

| | | | | |
|---|---|---|---|---|
| CA | 3139724 | A1 * | 5/2022 | .............. H04W 4/48 |
| EP | 0 539 145 | A1 | 10/1992 | |

(Continued)

OTHER PUBLICATIONS

JAN-7201/9201 (Year: 2021).*

*Primary Examiner* — Ronnie M Mancho
(74) *Attorney, Agent, or Firm* — Keating & Bennett, LLP (57) ABSTRACT

A method and apparatus to reduce or prevent misrecognition of an actual azimuth of a marine vessel includes acquiring a speed of the marine vessel and an azimuth of the marine vessel, and displaying a mark on a display based on the acquired speed and the acquired azimuth. The mark is displayed so as to allow the azimuth of the marine vessel to be determined in a case that the speed of the marine vessel exceeds a first predetermined speed, and the mark is displayed so as to not allow the azimuth of the marine vessel to be determined in a case that the speed of the marine vessel does not exceed the first predetermined speed.

13 Claims, 7 Drawing Sheets

(56) References Cited

U.S. PATENT DOCUMENTS

| | | | | |
|---|---|---|---|---|
| 2015/0039221 A1* | 2/2015 | Kabel | ................ | G01C 21/203 |
| | | | | 701/428 |
| 2015/0346914 A1 | 12/2015 | Ebi | | |
| 2015/0369914 A1* | 12/2015 | Corbett | ................ | G01S 15/89 |
| | | | | 345/440 |
| 2016/0098867 A1* | 4/2016 | Grace | ................ | G01S 19/13 |
| | | | | 701/21 |
| 2024/0337505 A1* | 10/2024 | Sohtell | ................ | G01S 13/87 |
| 2025/0076498 A1* | 3/2025 | Lai | ................ | G01S 15/89 |

FOREIGN PATENT DOCUMENTS

| | | | |
|---|---|---|---|
| JP | 05-113342 | A | 5/1993 |
| JP | 2001-183160 | A | 7/2001 |
| JP | 2004-317417 | A | 11/2004 |
| JP | 2015-141169 | A | 8/2015 |
| JP | 6015459 | B2 | 10/2016 |

* cited by examiner

METHOD AND APPARATUS FOR DISPLAYING AZIMUTH OF MARINE VESSEL, MARINE VESSEL, AND STORAGE MEDIUM

CROSS REFERENCE TO RELATED APPLICATIONS

This application claims the benefit of Japanese Patent Application No. 2022-190187, filed Nov. 29, 2022, which is hereby incorporated by reference herein in its entirety.

BACKGROUND OF THE INVENTION

1. Field of the Invention

The present invention relates to a method and an apparatus for displaying an azimuth of a marine vessel, a marine vessel, and a non-transitory storage medium.

2. Description of the Related Art

A technique for displaying a mark indicating the azimuth of a marine vessel on a display unit in a marine vessel is known (Japanese Laid-open Patent Publication (Kokai) No. 2001-183160 A). On the other hand, in the field of vehicles, there is known a technique of measuring a position and an azimuth of a vehicle and displaying a mark corresponding to a positioning accuracy thereof (Japanese Laid-open Patent Publication (Kokai) No. H5-113342).

The accuracy of the detected azimuth depends on the speed of the marine vessel. For example, unlike a vehicle, for a marine vessel, an actual azimuth may change due to the influence of wind or tidal current, and a deviation between the actual azimuth and a detected azimuth may occur. The degree of the deviation is even larger when the marine vessel slows down or is anchored. For this reason, if the azimuth acquired by the detection is displayed in the same manner at any time, the actual azimuth of the marine vessel may be misrecognized.

SUMMARY OF THE INVENTION

Preferred embodiments of the present invention provide methods and apparatuses to display an azimuth of marine vessels, marine vessels, and non-transitory storage mediums each able to reduce or prevent misrecognition of an actual azimuth of the marine vessel.

According to a preferred embodiment of the present invention, a method for displaying an azimuth of a marine vessel includes acquiring a speed of a marine vessel and an azimuth of a marine vessel, and displaying on a display a mark based on the acquired speed and the acquired azimuth, wherein the mark is displayed so as to allow the azimuth of the marine vessel to be determined in a case that the speed of the marine vessel exceeds a first predetermined speed, and the mark is displayed so as to not allow the azimuth of the marine vessel to be determined in a case that the speed of the marine vessel does not exceed the first predetermined speed.

According to this configuration, the speed of the marine vessel and the azimuth of the marine vessel are acquired, and a mark is displayed on the display based on the acquired speed and the acquired azimuth. In a case that the speed of the marine vessel exceeds the first predetermined speed, the mark is displayed so as to allow the azimuth of the marine vessel to be determined, and in a case that the speed of the marine vessel does not exceed the first predetermined speed, the mark is displayed so as to not allow the azimuth of the marine vessel to be determined. Therefore, it is possible to reduce or prevent erroneous recognition of the actual azimuth of the marine vessel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
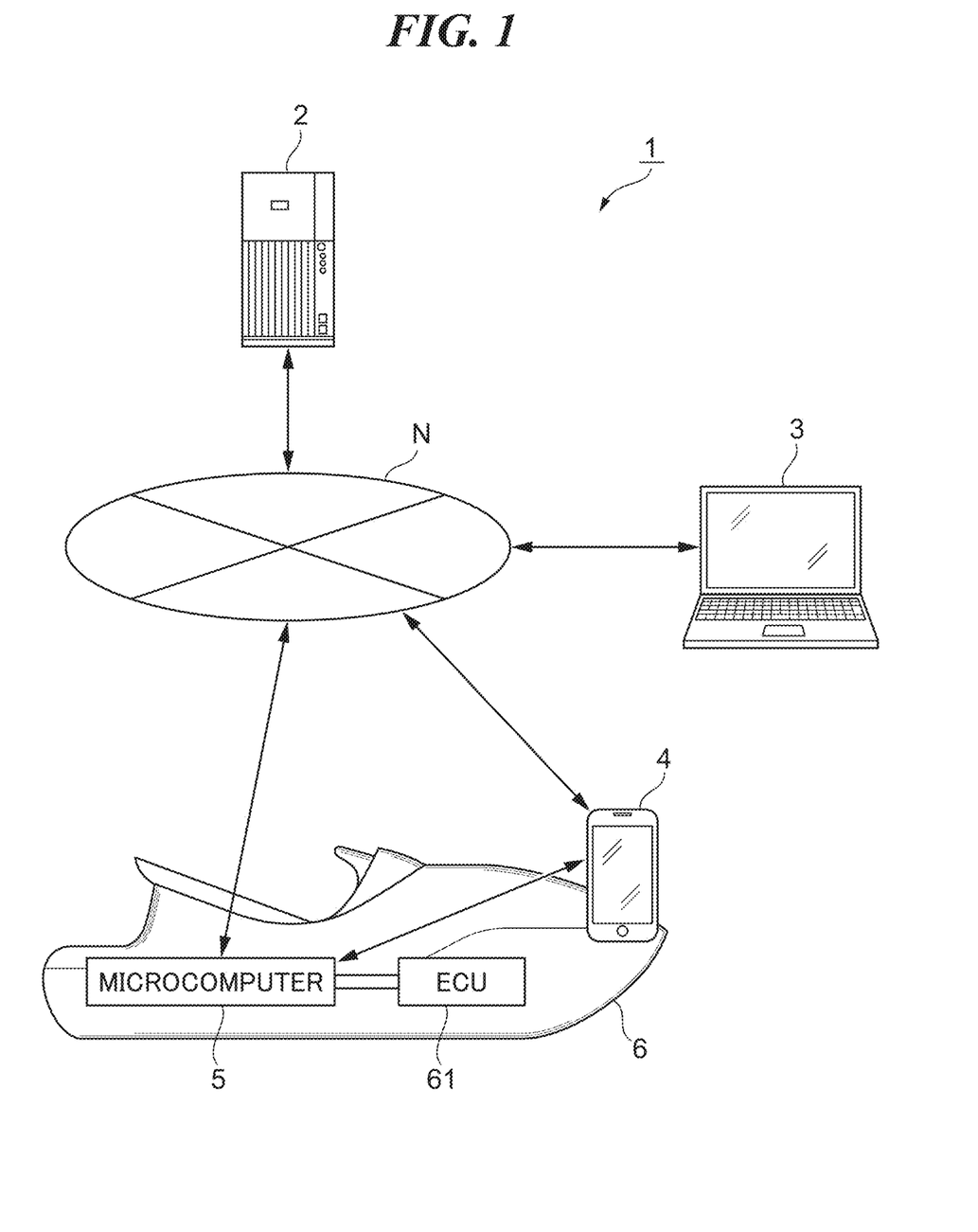
FIG. 1 is a diagram illustrating a configuration of an information processing system according to a preferred embodiment of the present invention.

FIG. 1 is a diagram illustrating a configuration of an information processing system 1 according to a preferred embodiment of the present invention.

The information processing system 1 includes a server 2, a PC terminal 3, a mobile terminal 4, a microcomputer 5, and an engine control unit (ECU) 61. The ECU 61 is mounted on a marine vessel 6. The server 2, the PC terminal 3, the mobile terminal 4, and the microcomputer 5 are connected so as to communicate with one another wirelessly or by wire via a network N. The mobile terminal 4 and the microcomputer 5 are directly connected and communicable with each other in a wired or wireless manner. Note that the numbers of each component included in the information processing system 1 may be two or more.

The PC terminal 3 may be a personal computer (PC), for example. The PC terminal 3 may be a smartphone, a tablet, a mobile phone, a notebook PC, or a wearable computer, for example.

The mobile terminal 4 is a mobile terminal attached to the marine vessel 6. The mobile terminal 4 may be held by a person on board the marine vessel 6. The mobile terminal 4 is typically a smartphone, or may be an information processing apparatus such as a PC, a tablet, a mobile phone, a notebook PC, or a wearable computer.

The microcomputer 5 is an information processing apparatus including a semiconductor device mounted on a substrate in the marine vessel 6 or a combination of a semiconductor device and an electronic component. The microcomputer 5 is implemented by hardware, firmware or software, or a combination thereof.

Figure 2:
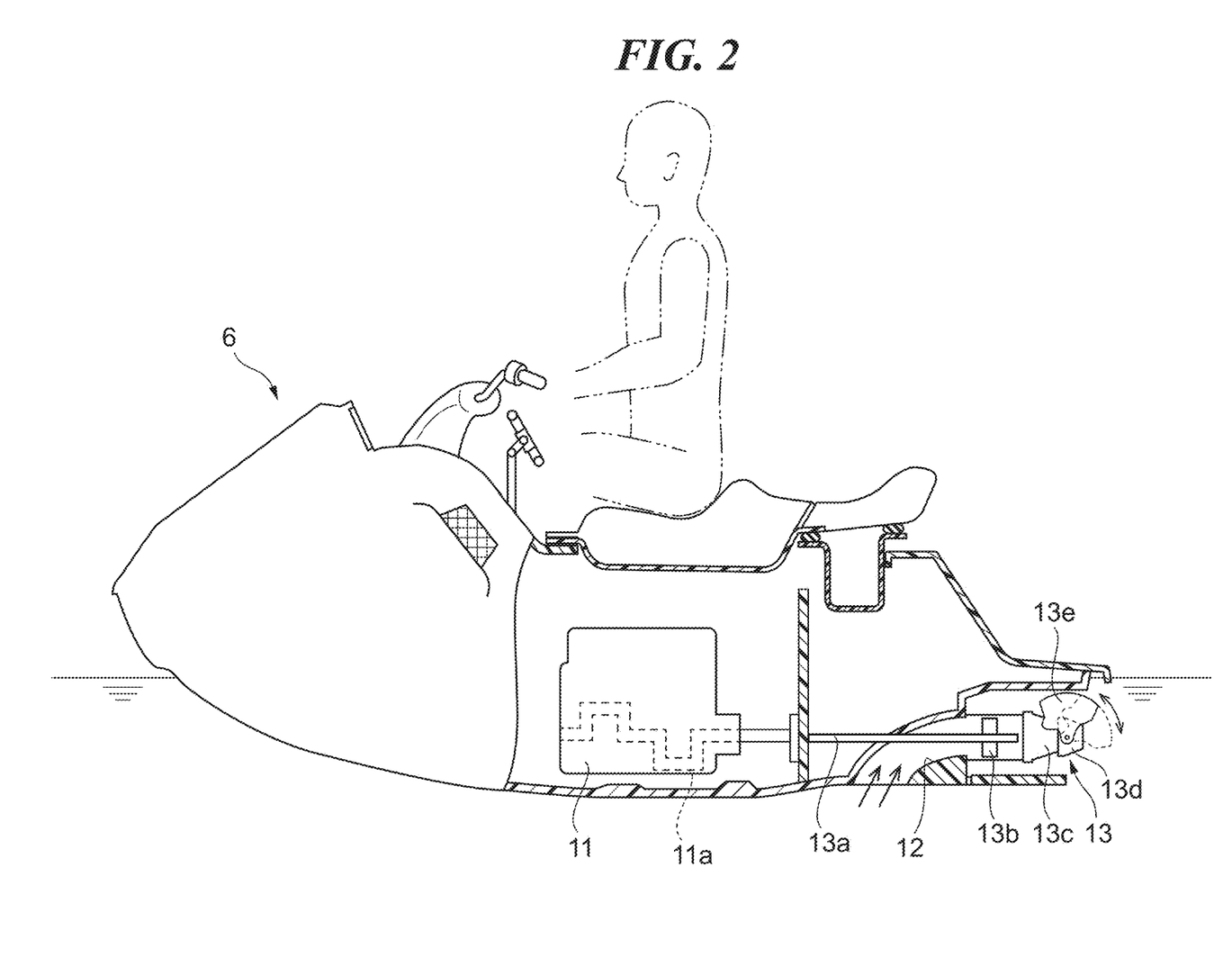
FIG. 2 is a side view of a marine vessel.

FIG. 2 is a side view of the marine vessel 6. The marine vessel 6 may be, for example, a water jet propulsion boat (watercraft), and is a so-called personal watercraft (PWC). Note that the type of the marine vessel 6 is not limited to a personal watercraft. Therefore, the marine vessel 6 is not limited to a PWC, and may be a marine vessel propelled by an outboard motor, an inboard motor, or an inboard/outboard motor.

The marine vessel 6 includes an engine 11 and a jet-propelled propulsion unit 13 to generate thrust by a driving force of the engine 11. The engine 11 and the propulsion unit 13 are propulsion devices to propel the marine vessel 6.

The engine 11 includes a crank shaft 11a. The propulsion unit 13 is driven by the engine 11 to take water into the water passage 12 including an opening provided on the lower surface of the rear portion of the marine vessel 6 and eject the water from the nozzle 13c located at the rear end of the marine vessel 6. As a result, the marine vessel 6 is propelled.

The propulsion unit 13 includes a drive shaft 13a, an impeller 13b, a nozzle 13c, a deflector 13d, and a reverse gate (bucket) 13e. The drive shaft 13a extends in the front-rear direction, and includes a front end connected to the crank shaft 11a and a rear end disposed in the water passage 12. The impeller 13b is fixed near the rear end of the drive shaft 13a.

The impeller 13b rotates together with the drive shaft 13a to generate a flow toward the nozzle 13c in the water passage 12. The nozzle 13c is disposed at a most downstream position of the water passage 12 in which the impeller 13b is disposed. The nozzle 13c functions as a water discharge port (ejection port). That is, the nozzle 13c is configured to eject water to generate propulsive force. The deflector 13d and the reverse gate 13e are provided in the nozzle 13c.

The deflector 13d is rotatable in the left-right direction about an axis extending in the up-down direction, and is configured to change the direction of water jetted from the nozzle 13c in the left-right direction. The reverse gate 13e is rotatable in the vertical direction about an axis extending in the horizontal direction. That is, the reverse gate 13e is configured to be able to change the direction of the water jetted from the nozzle 13c in the front-rear direction.

Figure 3:
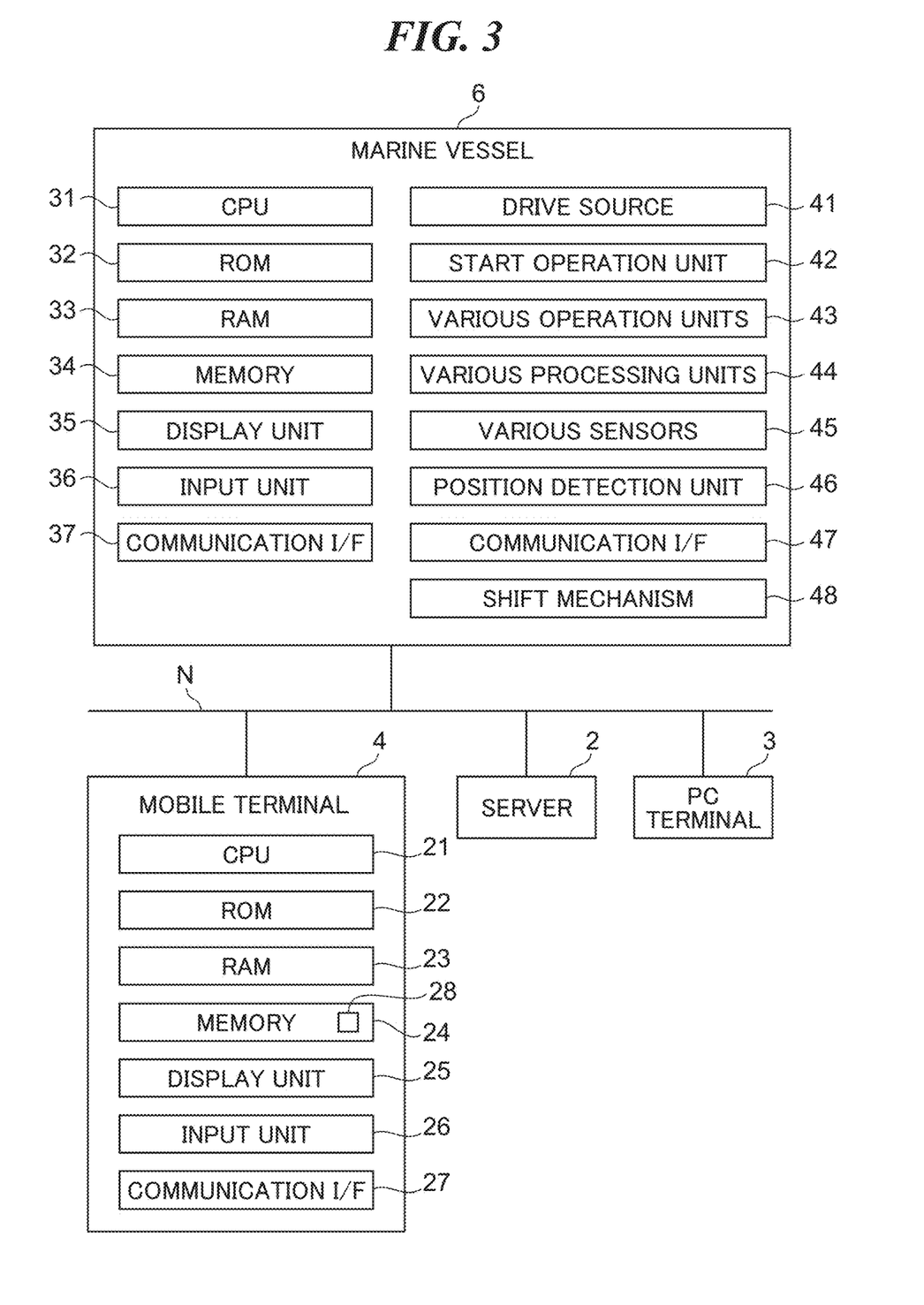
FIG. 3 is a block diagram of a main portion of the information processing system.

FIG. 3 is a block diagram of a main portion of the information processing system 1. The marine vessel 6 includes a CPU 31, a ROM 32, a RAM 33, a memory 34, a display unit 35, an input unit 36, a communication interface (I/F) 37, and a timer (not illustrated). The ROM 32 or the memory 34 stores a control program. The microcomputer 5 (FIG. 1) includes the CPU 31, the ROM 32, the RAM 33, the memory 34, and the like.

The CPU 31 implements various control processes by developing a control program stored in the ROM 32 or the like in the RAM 33 and executing the control program. The RAM 33 provides a work area when the CPU 31 executes the control program. The display unit 35 displays various types of information. The input unit 36 receives an input of a set value and an input of a mode from a vessel operator of the marine vessel 6. The communication I/F 37 is able to communicate with the network N, and is also able to communicate with the ECU 61 (FIG. 1) that controls the drive source 41 (corresponding to the engine 11) by a controller area network (CAN) or the like.

The marine vessel 6 includes the drive source 41, a start operation unit 42, various operation units 43, various processing units 44, various sensors 45, a position detection unit 46, a communication I/F 47, and a shift mechanism 48.

The start operation unit 42 is a start switch or the like to input an instruction to start the drive source 41. The various operation units 43 are operation units operated by a vessel operator to steer the marine vessel, such as a steering wheel and a remote controller. The various operation units 43 are also used by the vessel operator to input various settings. The various processing units 44 include the ECU 61 and process various operations related to the marine vessel 6. The various sensors 45 include sensors to detect operations of the various operation units 43.

The various sensors 45 may include an acceleration sensor, a velocity sensor, an angular velocity sensor, an azimuth sensor, an engine rpm sensor, a shift position sensor, and the like (none of which are illustrated). The position detection unit 46 receives a GPS signal (positioning information) from a global positioning system (GPS) satellite, and outputs position information indicating the current position of the marine vessel 6. The communication I/F 47 is able to communicate with the communication I/F 37 via CAN or the like.

The velocity sensor among the various sensors 45 detects the navigation speed (vessel speed) of the marine vessel 6. The azimuth sensor detects the azimuth of the marine vessel 6. Note that a method of detecting the speed and the azimuth of the marine vessel 6 is not limited, and for example, the speed and the azimuth may be detected (determined or calculated) based on the position information acquired by the position detection unit 46. The speed of the marine vessel 6 may be determined based on at least one of the engine rpm NE (the operating rpm of the propulsion device) detected by the engine rpm sensor or the position information (positioning information) acquired by the position detection unit 46. For example, the CPU 31 may determine, as the speed of the marine vessel 6, an intermediate value between the speed estimated from the engine rpm NE and the speed estimated from the transition of the position information.

The CPU 21 of the mobile terminal 4 may receive the engine rpm NE and the position information from the microcomputer 5 and may determine the speed of the marine vessel 6 based on at least one of the engine rpm NE or the position information.

The shift mechanism 48 includes the reverse gate 13e and a lever (not illustrated) to operate the reverse gate 13e. The shift position sensor among the various sensors 45 detects a shift position of the shift mechanism 48. When the marine vessel 6 is a PWC, the shift position sensor detects the position of the reverse gate 13e. The reverse gate 13e can be positioned at a forward position, a neutral position, and a backward position.

Note that in a shift mechanism configured to change a shift position via a gear, such as a shift mechanism applied to an outboard motor or the like, the shift position sensor can detect a shift position of a forward-backward switching mechanism in a propulsion device that propels a marine vessel. Note that, depending on the configuration, the shift position sensor may detect an actual shift position of the shift mechanism, or may detect an instruction position indicating the shift position.

The detection results by the various sensors 45, the position detection unit 46, and the like, and information on the travel mode are transmitted to the mobile terminal 4 as needed. The travel mode is a mode related to travel of the marine vessel 6, and includes a normal mode set by default and a low-speed travel mode indicating low-speed travel (in the low-speed travel mode, the marine vessel 6 travels at a lower speed than in the normal mode). Furthermore, the CPU 31 determines whether the reception state of the GPS signal by the position detection unit 46 is good or bad, and transmits the information about the determination to the mobile terminal 4 as needed.

The mobile terminal 4 includes a CPU 21, a ROM 22, a RAM 23, a memory 24, a display unit 25, an input unit 26, a communication I/F 27, and a timer (not illustrated). The CPU 21 implements various control processes by developing a control program stored in the ROM 22 or the memory 24 in the RAM 23 and executing the control program. The RAM 23 provides a work area when the CPU 21 executes the control program. The display unit 25 displays various types of information. The input unit 26 receives inputs of various settings and inputs of various instructions from the user of the mobile terminal 4.

The memory 24 stores applications to implement various processes. For example, azimuth display process (FIG. 7) to be described below is implemented by the application 28 downloaded from the server 2. The communication I/F 27 is able to communicate with the network N. The communication I/F 27 also includes a near field wireless communication function such as Bluetooth (registered trademark). Note that the mobile terminal 4 may include a position detection unit similar to the position detection unit 46.

The numbers of each of the marine vessel 6, the mobile terminal 4, and the PC terminal 3, which are communicably connected to the server 2 may be two or more. Note that the communication I/Fs 27, 37, and 47 may include a plurality of communication functions, and a method of the communication functions may be wired or wireless. Furthermore, any of the communication I/Fs 27, 37, and 47 may include a function of communicating with the network N, and/or may include a near field wireless communication function.

Figure 4A:
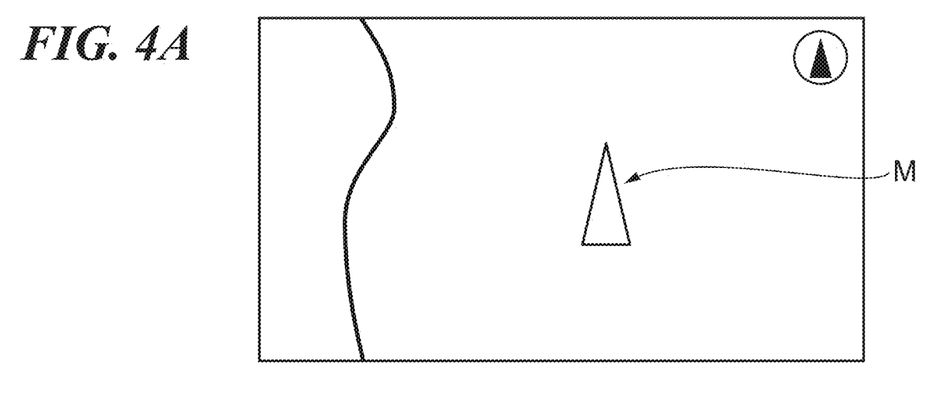
FIGS. 4A to 4C are diagrams illustrating screen examples displayed by an azimuth display process.
Figure 4B:
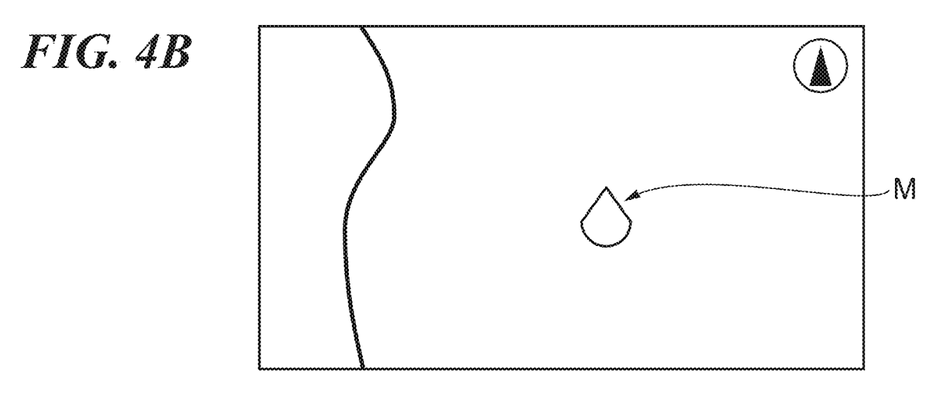
Figure 4C:
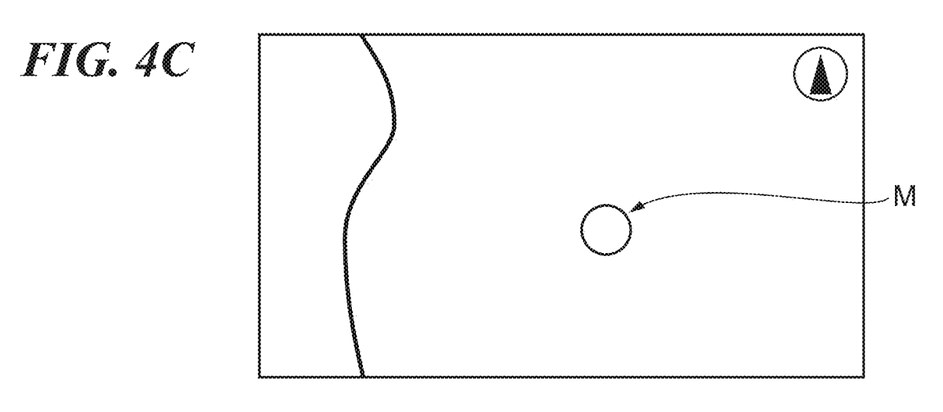
Figure 7:
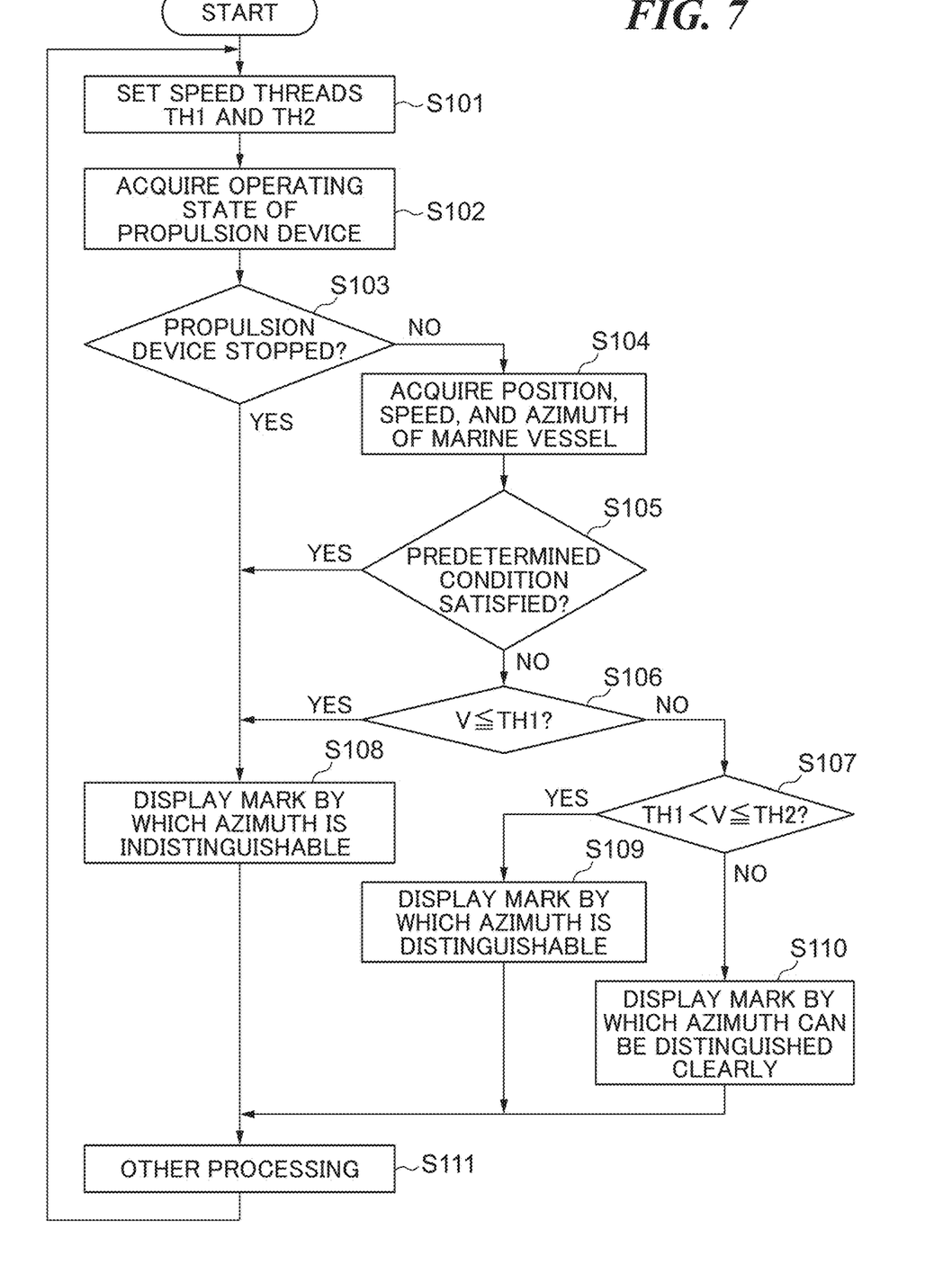
FIG. 7 is a flowchart illustrating an azimuth display processing.

FIGS. 4A to 4C are diagrams illustrating screen examples displayed by the azimuth display process (FIG. 7). These screens are displayed on the display unit 25 of the mobile terminal 4.

The CPU 21 of the mobile terminal 4 displays the mark M on the screen. The mark M is displayed to allow the user (vessel operator) to recognize the azimuth of the marine vessel 6 at the present time, or the current azimuth of the marine vessel 6, or the current orientation of the marine vessel 6. The CPU 21 receives and acquires the speed and the azimuth of the marine vessel 6 detected on the marine vessel 6 from the microcomputer 5, and changes the display mode of the mark M based on the detected speed and azimuth.

In the screen, the upper side indicates north, and the mark M is displayed at the center of the screen as an example. The coordinates of the mark M on the map indicate the current position of the marine vessel 6, and a numerical value indicating the coordinates of the center of the screen is separately displayed as the current position (not illustrated). The vessel operator is able to recognize the azimuth of the marine vessel 6 from the shape and orientation of the mark M. In addition, the vessel operator is able to recognize the current position of the marine vessel 6 from the coordinates of the mark M on the map.

Unlike a vehicle, for a marine vessel, a deviation between a detected azimuth and an actual azimuth occurs due to the influence of wind and tidal current, and the degree of the deviation may be even large depending on a situation in which when the marine vessel slows down or is anchored, or the like. Therefore, in order not to cause erroneous recognition of the actual azimuth of the marine vessel 6, the CPU 21 displays the mark M such that the ease of determining the azimuth of the marine vessel 6 is lowered or that the azimuth of the marine vessel 6 cannot be determined, in a situation where the deviation becomes large. Details of the process of controlling the display mode of the mark M will be described below (FIG. 7).

In FIGS. 4A to 4C, the ease of determining (distinguishing) the azimuth of the marine vessel 6 varies by different shapes of the mark M. The mark M in FIG. 4A is an isosceles triangle, and the direction in which the sharpest corner faces (upward in FIG. 4A) indicates the azimuth of the marine vessel 6. Accordingly, the vessel operator is able to clearly determine that the azimuth of the marine vessel 6 illustrated in FIG. 4A is north. The CPU 21 matches the direction in which the sharpest corner of the mark M faces with the acquired azimuth of the marine vessel 6. The mark M in FIG. 4B has a shape in which a portion (upper portion) of the circle is a corner. The corner portion of the mark M in FIG. 4B has a larger angle than the sharpest angle of the mark M in FIG. 4A. Accordingly, the vessel operator is able to determine that the azimuth of the marine vessel 6 illustrated in FIG. 4B is north. The mark M in FIG. 4C is circular and is not pointed in any direction, that is, does not indicate an azimuth.

As described above, in FIGS. 4A and 4B, it can be recognized that the azimuth of the marine vessel 6 is north, and in FIG. 4C the azimuth of the marine vessel 6 cannot be recognized. The mark M in FIG. 4A is the easiest to determine the azimuth, in FIG. 4B the azimuth is slightly less easily determined than in FIG. 4A, and in FIG. 4C the azimuth of the marine vessel 6 cannot be determined.

Figure 5A:
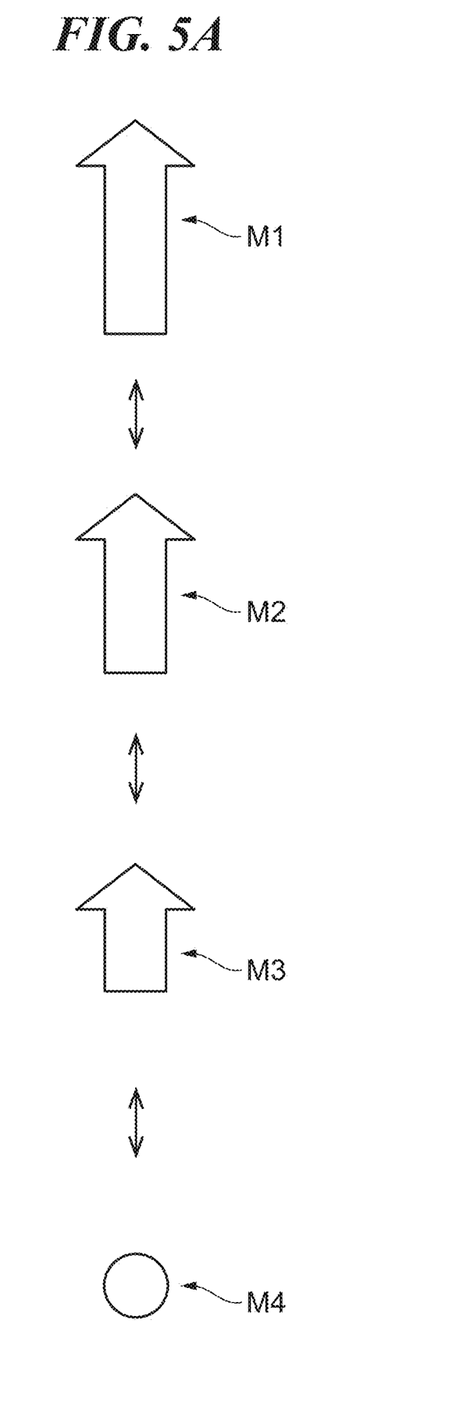
FIGS. 5A and 5B are diagrams illustrating modifications of a display mode of a mark.
Figure 5B:
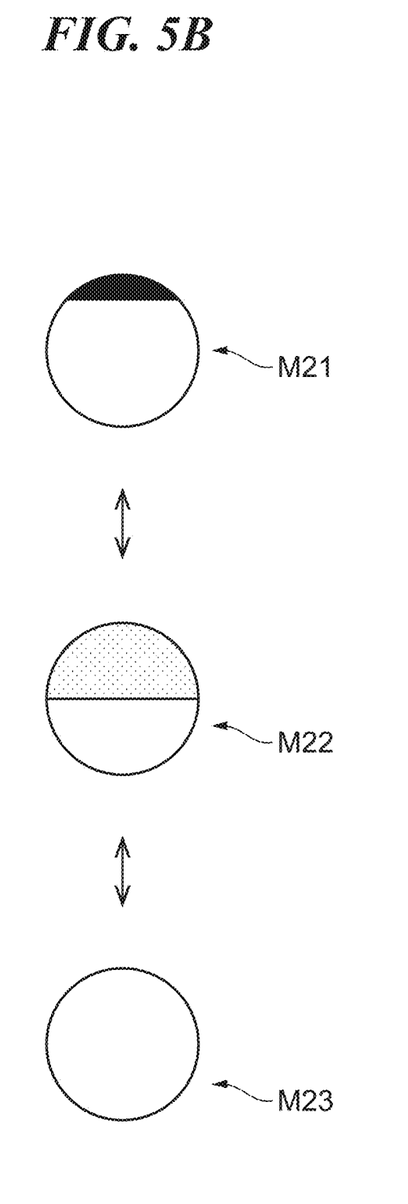

The display mode such as the shape of the mark that makes the ease of determining the azimuth different is not limited to the display mode illustrated in FIGS. 4A to 4C, and modifications illustrated in FIGS. 5A and 5B may be used.

Alternatively, as illustrated in FIG. 5A, the mark may have an arrow shape according to the azimuth. In addition, the stage of changing the display mode of the mark is not limited to three stages, and may be two stages or four or more stages. Alternatively, the display mode may be seamlessly changed. In the example of the display mode illustrated in FIG. 5A, the length of the arrow varies depending on the stage. The mark M1 is the easiest to determine the azimuth of the marine vessel 6, followed by the marks M2 and M3, in this order, the azimuth is less easy to determine, and the azimuth cannot be determined by the mark M4.

Alternatively, as illustrated in FIG. 5B, the mark may have a constant shape such as a circle, and some other identification information may be added to the position indicating the azimuth in the mark. For example, some or all of the colors of the marks may be different from each other according to the ease of determining the azimuth. In the example illustrated in FIG. 5B, the outer shapes of the marks M21, M22, and M23 are the same, and are all circular. In the mark M21 by which the azimuth is most easily determined, a portion of the position indicating the azimuth is displayed in the first color. In the mark M22 by which the azimuth is second easily determined, the upper half is displayed in the second color (different from the first color). In the mark M23 by which the azimuth cannot be determined, the entire mark is displayed in a third color (different from both the first color and the second color) or is displayed colorless.

Figure 6:
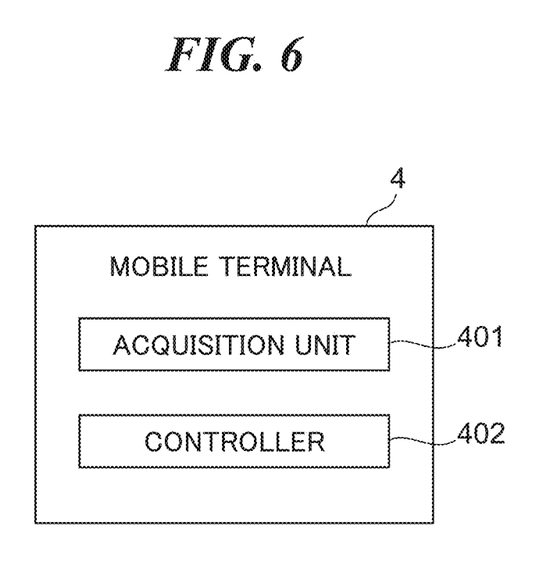
FIG. 6 is a diagram illustrating a functional block that implements an azimuth display process in a mobile terminal.

FIG. 6 is a diagram illustrating a functional block that implements an azimuth display process in the mobile terminal 4. The functional block includes an acquisition unit 401 and a controller 402 as functional units. These functional units are mainly implemented by cooperation of any two or more of the CPU 21, the ROM 22, the RAM 23, the memory 24, the display unit 25, and the communication I/F 27, of the mobile terminal 4. In the mobile terminal 4, the application 28 is installed in advance. When the application 28 is activated, the functions of the functional units described above are executed.

First, the acquisition unit 401 acquires the speed V of the marine vessel 6 and the azimuth of the marine vessel 6. The controller 402 causes the display unit 25 to display the mark M based on the acquired speed V and azimuth. In particular, in a case that the speed V exceeds the first predetermined speed TH1 (TH1<V), the controller 402 displays the mark M so as to allow the vessel operator to determine the azimuth of the marine vessel 6 (for example, FIGS. 4A and 4B). In a case that the speed V exceeds a second predetermined speed TH2, which is greater (faster) than the first predetermined speed TH1 (TH1<TH2<V), the controller 402 displays the mark M so as to allow the vessel operator to determine, more clearly and easily, the azimuth of the marine vessel 6 (for example, FIG. 4A). In a case that the speed V does not exceed the first predetermined speed TH1 (V≤TH1), the controller 402 displays the mark M so as to not allow the vessel operator to determine the azimuth of the marine vessel 6 (for example, FIG. 4C).

FIG. 7 is a flowchart illustrating an azimuth display process. In the mobile terminal 4, the CPU 21 develops a program stored in the ROM 22 or the memory 24 in the RAM 23 and executes the program thus implementing the azimuth display process. This azimuth display process is started when the application 28 is activated.

In step S101, the CPU 21 sets a speed threshold. Here, the first predetermined speed TH1 and the second predetermined speed TH2 are set as the speed threshold. However, the number of speed thresholds to be set is not limited to two, and may be one or three or more. The speed threshold (value of TH1, value of TH2) is stored in the memory 24 in advance. As described above, first predetermined speed TH1<second predetermined speed TH2. For example, TH1=5 km/h and TH2=15 km/h.

In the second and subsequent loops of the flowchart of the azimuth display process, the speed threshold may be dynamically set. For example, the speed threshold value may be set according to the distance between the detected obstacle or the like (including land, islands, bridges, and the like) and the marine vessel 6. That is, the CPU 21 may set at least one of the first predetermined speed TH1 and the second predetermined speed TH2 according to the distance between the obstacle or the like acquired from the microcomputer 5 and the marine vessel 6. In this case, the set speed threshold may be larger (faster) as the distance between the obstacle or the like and the marine vessel 6 is shorter.

In step S102, the CPU 21 acquires (information on) the operating state of the propulsion device (the engine 11 and the propulsion unit 13). Specifically, the CPU 21 acquires an engine rpm NE which is an operating rpm of the engine 11. The engine rpm NE is detected by engine rpm sensors among the various sensors 45, and is transmitted to the mobile terminal 4 as needed.

In step S103, the CPU 21 determines whether or not the propulsion device has stopped, that is, whether or not the engine 11 is in a stopped state, based on the acquired engine rpm NE. In a case that the engine rpm NE is equal to or less than a predetermined rpm, it is determined that the engine 11 is in a stopped state. In a case that the CPU 21 determines that the engine 11 is in the stopped state, the CPU 21 advances the process to step S108. In a case that the CPU 21 determines that the engine 11 is not in the stopped state, the CPU 21 advances the process to step S104.

In step S108, the CPU 21 displays on the display unit 25 the mark M by which the azimuth of the marine vessel 6 is indistinguishable. For example, a mark M in FIG. 4C, a mark M4 in FIG. 5A, and a mark M23 in FIG. 5B can be displayed. That is, in a case that the operating state of the propulsion device indicates that the propulsion device is stopped, the mark M by which the azimuth of the marine vessel 6 is indistinguishable is displayed regardless of the speed of the marine vessel 6. This is because the detection accuracy of the azimuth of the marine vessel 6 is low when the engine 11 is in a stopped state. By displaying the mark M by which the azimuth of the marine vessel 6 is indistinguishable, it is possible to prevent the vessel operator from erroneously believing the actual azimuth of the marine vessel 6.

In step S104, the CPU 21 acquires the current position of the marine vessel 6, the current speed V of the marine vessel 6, and the current azimuth of the marine vessel 6. These pieces of information are acquired by being received from the microcomputer 5 of the marine vessel 6. As described above, the CPU 21 may determine the speed V based on at least one of the engine rpm NE and the position information which are received from the marine vessel 6.

In step S105, the CPU 21 determines whether or not a predetermined condition is satisfied. Here, a predetermined condition will be exemplified. In a case that at least one of the following conditions (a) to (e) is satisfied, it is determined that the "predetermined condition is satisfied":

(a) reception state of GPS signal is poor;
(b) the shift position of the shift mechanism 48 of the propulsion device is a neutral position or a backward position;
(c) a low speed travel mode is set;
(d) the engine rpm NE is less than or equal to the first predetermined rpm NE1 and the speed V is greater than or equal to the third predetermined speed TH3 (NE≤NE1 and TH3≤V); and
(e) the engine rpm NE is greater than or equal to the second predetermined rpm NE2 and the speed V is less than or equal to the fourth predetermined speed TH4 (NE2≤NE and V≤TH4).

Whether the condition (a) is satisfied or not is determined from the information indicating the determination result of the quality (good or bad) of the reception state of the GPS signal by the position detection unit 46. Regarding the condition (b), information on the shift position is received from the microcomputer 5. Note that regarding the condition (b), as described above, the shift position may be an actual position, or may be an instructed or determined shift position. For example, in a marine vessel having a configuration in which a forward function and a backward function are independently provided on a left handle lever and a right handle lever, that is, the forward function is provided on one of a right handle lever and a left handle lever and the backward function is provided on the other handle lever, as in "RiDE" manufactured by Yamaha Motor Co., Ltd., the shift position may be determined based on a mode designated according to a combination of operations of both the handle levers.

Regarding the conditions (d) and (e), the engine rpm NE is received from the microcomputer 5 or determined by the CPU 21. For the conditions (d) and (e), the first predetermined rpm NE1 is smaller than the second predetermined rpm NE2 (NE1<NE2). For example, the third predetermined speed TH3 is equal to the second predetermined speed TH2 (TH3=TH2). A magnitude relationship of the predetermined speeds (speed thresholds) is TH1≤TH4<TH3=TH2. Further, in the conditions (d) and (e), the speed V is a value detected and determined based on at least a GPS signal.

In a case that the predetermined condition is satisfied, in step S105, the CPU 21 advances the process to step S108. Therefore, the mark M by which the azimuth of the marine vessel 6 is indistinguishable is displayed on the display unit 25. This is because, when even any one of the conditions (a)

to (e) is satisfied, it is considered that the reliability of the detected azimuth is low. The mark M in which the azimuth of the marine vessel 6 is indistinguishable is displayed in a case that it is considered that the reliability of the detected azimuth is low, which makes it possible to prevent the vessel operator from erroneously believing the actual azimuth of the marine vessel 6.

For example, in a case that the condition (d) is satisfied, NE≤NE1 and TH3≤V are satisfied. That is, the speed estimated from the engine rpm NE is low, whereas the detected speed V of the marine vessel 6 is medium or higher. In this case, there is a possibility that the marine vessel 6 is flown by the tailwind and the marine vessel 6 is traveling at a speed faster than intended or the azimuth of the marine vessel 6 is changed, and it is therefore considered that the reliability of the detected azimuth is low.

In a case that the condition (e) is satisfied, NE2≤NE and V≤TH4 are satisfied. That is, the speed estimated from the engine rpm NE is medium or higher, whereas the detected speed V of the marine vessel 6 is low. In this case, there is a possibility that the marine vessel 6 cannot travel at an intended speed or the azimuth of the marine vessel 6 is unintentionally changed, due to a headwind or the like, and it is therefore considered that the reliability of the detected azimuth is low.

In a case that the predetermined condition is not satisfied, in step S105, the CPU 21 advances the process to step S106. In step S106, the CPU 21 determines whether or not the detected speed V is equal to or less than the first predetermined speed TH1 (V≤TH1). In a case that V≤TH1 (YES in step S106), the CPU 21 advances the process to step S108. In this case, the marine vessel 6 is in a low speed or at anchor, the reliability of the acquired azimuth is therefore low. When the reliability of the acquired azimuth is low, the mark M by which the azimuth of the marine vessel 6 is indistinguishable is displayed, which makes it possible to reduce or prevent erroneous recognition of the actual azimuth of the marine vessel 6.

On the other hand, when TH1<V (NO in step S106), the CPU 21 advances the process to step S107, and determines whether or not the speed V is a value greater than the first predetermined speed TH1 and less than or equal to the second predetermined speed TH2 (TH1<V≤TH2). The CPU 21 proceeds to step S109 in a case that TH1<V≤TH2 (YES in step S107), and proceeds to step S110 in a case that TH2<V (NO in step S107).

In step S109, the CPU 21 displays the mark M by which the azimuth of the marine vessel 6 is distinguishable. In step S110 (TH2<V), the CPU 21 displays the mark M such that the azimuth of the marine vessel 6 is able to be more clearly and easily distinguished as compared with the case of step S109 (TH1<V≤TH2). For example, in step S109, the mark M in FIG. 4B or the mark M22 in FIG. 5B is displayed. For example, in step S110, the mark M in FIG. 4A or the mark M21 in FIG. 5B is displayed. This is based on that the reliability of the acquired azimuth is higher in the case of TH2<V than in the case of TH1<V≤TH2.

As described above, when the speed V of the marine vessel 6 exceeds the first predetermined speed TH1, the CPU 21 changes the display mode of the mark M according to the speed V. In particular, the CPU 21 changes the shape and/or color of the mark M so that the faster the speed V, the clearer the azimuth.

Note that, in a case that the stage of making the display mode of the mark different is four or more stages (FIG. 5A), control may be performed as follows. For example, the mark M4 may be displayed when V≤TH1, the mark M3 may be displayed when TH1<V≤TH2, the mark M2 may be displayed when TH2<V≤TH5, and the mark M1 may be displayed when TH5<V. Here, TH5 is a value faster (larger) than TH2 (TH2<TH5).

After steps S108, S109, and S110, the CPU 21 advances the process to step S111, executes other processing, and returns the process to step S101. In other processing, for example, when being notified of the change of the travel mode, the CPU 21 stores the latest travel mode in the memory 24. The travel mode is set in the marine vessel 6 based on an instruction from the vessel operator, and is notified to the mobile terminal 4. In a case of receiving an instruction to stop or end the application 28, the CPU 21 executes a process to interrupt or end the process illustrated in FIG. 7.

According to a preferred embodiment, the CPU 21 acquires the speed V of the marine vessel 6 and the azimuth of the marine vessel 6, and displays the mark M on the display unit 25 based on the acquired speed V and azimuth. At this time, in a case that the speed V exceeds the first predetermined speed TH1, the CPU 21 displays the mark M so as to allow the vessel operator to determine the azimuth of the marine vessel 6, whereas in a case that the speed V does not exceed the first predetermined speed TH1, the CPU 21 displays the mark M so as to not allow the vessel operator to determine the azimuth of the marine vessel 6. As a result, it is possible to reduce or prevent erroneous recognition of the actual azimuth of the marine vessel 6.

In addition, in a case that the speed V of the marine vessel 6 exceeds the first predetermined speed TH1, the CPU 21 changes the display mode of the mark M according to the speed V, wherein in particular, the shape and/or color of the mark M are changed such that as the speed V increases, the azimuth becomes clearer. Therefore, as the reliability of the acquired azimuth is higher, the azimuth can be more clearly recognizable.

In addition, in the stopped state of the engine 11, a mark M by which the azimuth of the marine vessel 6 is indistinguishable is displayed regardless of the speed V of the marine vessel 6. In this way, for example, by avoiding the notification of the azimuth in a situation where the marine vessel 6 turns, it is possible to reduce or prevent the misrecognition of the actual azimuth of the marine vessel 6.

In addition, by setting the speed threshold value (TH1 or the like) according to the distance between the marine vessel 6 and an obstacle or the like such as land, it is possible to prevent the marine vessel 6 from excessively getting too close to the obstacle or the like due to misrecognition of the marine vessel 6.

In addition, in step S105, when at least one of the conditions (a) to (e) is satisfied, a mark M by which the azimuth of the marine vessel 6 is indistinguishable is displayed. Accordingly, by avoiding the notification of the azimuth when the reliability of the detected azimuth is low, it is possible to reduce or prevent erroneous recognition of the actual azimuth of the marine vessel 6.

Note that in the present preferred embodiment, the azimuth display process illustrated in FIG. 7 is executed by the mobile terminal 4 serving as the azimuth display apparatus for displaying the azimuth of the marine vessel 6. However, the present invention is not limited thereto. For example, the microcomputer 5 may execute the azimuth display process and display the mark M on the display unit 35 of the marine vessel 6. In this case, the microcomputer 5 and the display unit 35 serve as an azimuth display apparatus for displaying the azimuth of the marine vessel 6.

In addition, the microcomputer 5 may execute processes other than the azimuth display process illustrated in FIG. 7, for example, transmit information necessary for display to the mobile terminal 4, and the mobile terminal 4 may display the mark M on the display unit 25 based on the received information necessary for display. In this case, for example, the microcomputer 5 acquires the speed V and the azimuth, and generates the mark M based on the speed V and the azimuth. The microcomputer 5 generates a mark M by which the azimuth is distinguishable in a case that TH1<V, and generates a mark M by which the azimuth is indistinguishable in a case that V TH1. Then, the microcomputer 5 transmits the generated mark M to the mobile terminal 4. The mobile terminal 4 displays the received mark M.

Note that it is not essential to display information for notifying the current position of the marine vessel 6 on the screen displayed by the azimuth display process (FIGS. 4A to 4C and the like). For example, the mark M may be a display for the purpose of only notifying the azimuth of the marine vessel 6, and it is not essential that the position information of the marine vessel 6 be determined by the mark M or the like.

The propulsion device of the marine vessel 6 is not limited to a propulsion device having a configuration including an engine as a drive source, and the propulsion device of the marine vessel 6 may have a configuration including, for example, an electric motor.

Preferred embodiments of the present invention can be implemented by a process in which a program to implement one or more functions, which are described in preferred embodiments above, is supplied to a system or an apparatus via a network or a non-transitory storage medium, and one or more processors of a computer of the system or the apparatus reads and executes the program. The above program and the storage medium storing the above program are encompassed by the scope the present invention. The present invention can also be implemented by a circuit (for example, ASIC) that implements one or more of the functions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for displaying an azimuth of a marine vessel, the method comprising:
   acquiring a speed of a marine vessel and an azimuth of a marine vessel; and
   displaying on a display a mark based on the acquired speed and the acquired azimuth; wherein
   the mark is displayed so as to allow the azimuth of the marine vessel to be determined in a case that the speed of the marine vessel exceeds a first predetermined speed, and the mark is displayed so as to not allow the azimuth of the marine vessel to be determined in a case that the speed of the marine vessel does not exceed the first predetermined speed.

2. The method according to claim 1, further comprising:
   changing a display mode of the mark according to the speed of the marine vessel in the case that the speed of the marine vessel exceeds the first predetermined speed.

3. The method according to claim 2, further comprising:
   in a case that the speed of the marine vessel exceeds a second predetermined speed, displaying the mark so as to allow the azimuth of the marine vessel to be determined more clearly and easily as compared with a case that the speed of the marine vessel exceeds the first predetermined speed but does not exceed the second predetermined speed which is higher than the first predetermined speed.

4. The method according to claim 1, further comprising:
   acquiring information on an operation state of a propulsion device that propels the marine vessel; and
   in a case that the information on the operating state of the propulsion device indicates the propulsion device being stopped, displaying the mark so as to not allow the azimuth of the marine vessel to be determined regardless of the speed of the marine vessel.

5. The method according to claim 1, further comprising:
   acquiring a distance between land or an obstacle and the marine vessel; and
   setting the first predetermined speed according to the acquired distance.

6. The method according to claim 3, further comprising:
   acquiring a distance between land or an obstacle and the marine vessel; and
   setting the first predetermined speed and the second predetermined speed according to the acquired distance.

7. The method according to claim 1, further comprising:
   displaying the mark so as to not allow the azimuth of the marine vessel to be determined regardless of the speed of the marine vessel in a case that at least one of following conditions is satisfied:
   a reception state of positioning information is poor;
   a shift position of a shift mechanism of a propulsion device that propels the marine vessel is a neutral position or a backward position; and
   a travel mode indicating low speed travel is set.

8. The method according to claim 1, further comprising:
   acquiring an operating rpm of a propulsion device that propels the marine vessel; and
   displaying the mark so as to not allow the azimuth of the marine vessel to be determined in a case that the acquired operating rpm is equal to or lower than a first predetermined rpm and the speed of the marine vessel is equal to or higher than a third predetermined speed.

9. The method according to claim 1, further comprising:
   acquiring an operating rpm of a propulsion device that propels the marine vessel; and
   displaying the mark so as to not allow the azimuth of the marine vessel to be determined in a case that the acquired operating rpm is equal to or higher than a second predetermined rpm and the speed of the marine vessel is equal to or lower than a fourth predetermined speed.

10. The method according to claim 1, further comprising:
    acquiring the speed of the marine vessel based on at least one of an operating rpm of a propulsion device that propels the marine vessel and received positioning information.

11. A marine vessel comprising:
    a display:
    at least one memory to store a set of instructions; and
    at least one processor configured or programmed to:
      acquire a speed of a marine vessel and an azimuth of the marine vessel; and
      display on the display a mark based on the acquired speed and the acquired azimuth; wherein
    the mark is displayed so as to allow the azimuth of the marine vessel to be determined in a case that the speed of the marine vessel exceeds a first predetermined speed, and the mark is displayed so as to not allow the azimuth of the marine vessel to be determined in a case that the speed of the marine vessel does not exceed the first predetermined speed.

12. An azimuth display apparatus comprising:

a display to display an azimuth of a marine vessel;

at least one memory to store a set of instructions; and at least one processor configured or programmed to:

acquire a speed of a marine vessel and an azimuth of the marine vessel; and display on the display a mark based on the acquired speed and the acquired azimuth; wherein the mark is displayed so as to allow the azimuth of the marine vessel to be determined in a case that the speed of the marine vessel exceeds a first predetermined speed, and the mark is displayed so as to not allow the azimuth of the marine vessel to be determined in a case that the speed of the marine vessel does not exceed the first predetermined speed.

13. A non-transitory storage medium storing a program to cause a computer to execute a method for displaying an azimuth of a marine vessel, the method comprising:

acquiring a speed of a marine vessel and an azimuth of a marine vessel; and displaying on a display a mark based on the acquired speed and the acquired azimuth; wherein the mark is displayed so as to allow the azimuth of the marine vessel to be determined in a case that the speed of the marine vessel exceeds a first predetermined speed, and the mark is displayed so as to not allow the azimuth of the marine vessel to be determined in a case that the speed of the marine vessel does not exceed the first predetermined speed.

* * * * *